(12) United States Patent
Choi et al.

(10) Patent No.: US 9,236,032 B2
(45) Date of Patent: Jan. 12, 2016

(54) APPARATUS AND METHOD FOR PROVIDING CONTENT EXPERIENCE SERVICE

(71) Applicant: Electronics and Telecommunications Research Institute, Daejeon (KR)

(72) Inventors: Yoonseok Choi, Daejeon (KR); Soonchul Jung, Daejeon (KR); Jinsung Choi, Daejeon (KR); Bonki Koo, Daejeon (KR)

(73) Assignee: ELECTRONICS AND TELECOMMUNICATIONS RESEARCH INSTITUTE, leDaejeon (KR)

( * ) Notice: Subject to any disclaimer, the term of this patent is extended or adjusted under 35 U.S.C. 154(b) by 0 days.

(21) Appl. No.: 14/449,036

(22) Filed: Jul. 31, 2014

(65) Prior Publication Data
US 2015/0078621 A1    Mar. 19, 2015

(30) Foreign Application Priority Data

Sep. 13, 2013   (KR) .......................... 10-2013-0110421

(51) Int. Cl.
*G06K 9/00* (2006.01)
*G09G 5/14* (2006.01)
(Continued)

(52) U.S. Cl.
CPC .. *G09G 5/14* (2013.01); *G06F 3/00* (2013.01); *G06T 7/2033* (2013.01); *G06T 2207/10016* (2013.01); *G06T 2207/30196* (2013.01); *G06T 2207/30204* (2013.01)

(58) Field of Classification Search
CPC ...... G06T 7/20; G06T 7/2033; G06K 2209/15
USPC .................................. 382/103, 107; 345/633
See application file for complete search history.

(56) References Cited

U.S. PATENT DOCUMENTS

| | | | | |
|---|---|---|---|---|
| 6,057,856 A | * | 5/2000 | Miyashita | ............... G06T 15/00 345/633 |
| 6,308,565 B1 | * | 10/2001 | French | ............... A63B 24/0003 73/379.04 |
| 6,917,370 B2 | * | 7/2005 | Benton | ................. G06T 19/006 345/204 |

(Continued)

FOREIGN PATENT DOCUMENTS

| KR | 10-2010-0084597 A | 7/2010 |
|---|---|---|
| KR | 10-2012-0013021 A | 2/2012 |

(Continued)

*Primary Examiner* — John Strege

(57) ABSTRACT

A method and apparatus for providing content experience service are disclosed. The apparatus includes a camera device tracking unit, a user behavior tracking unit, a real image acquisition unit, a motion information processing unit, a virtual space control unit, and a virtual multi-image generation unit. The camera device tracking unit collects camera motion information. The user behavior tracking unit collects user motion information. The real image acquisition unit photographs a space including the user, and separates a real image into a foreground and a background using a background key table. The motion information processing unit corrects the camera motion information and the user motion information. The virtual space control unit generates virtual space control information and virtual space information. The virtual multi-image generation unit generates a virtual multi-image, and provides the content experience service based on the generated virtual multi-image.

11 Claims, 10 Drawing Sheets

(51) Int. Cl.
*G06T 7/20* (2006.01)
*G06F 3/00* (2006.01)

(56) References Cited

U.S. PATENT DOCUMENTS

| | | | |
|---|---|---|---|
| 8,194,101 B1* | 6/2012 | Mann | G09G 5/00 345/633 |
| 8,294,732 B2* | 10/2012 | Cheng | A63F 13/10 345/619 |
| 2003/0038805 A1* | 2/2003 | Wong | A63F 13/12 345/473 |
| 2004/0189676 A1* | 9/2004 | Dischert | G06T 5/20 345/639 |
| 2005/0024388 A1* | 2/2005 | Takemoto | G06T 19/006 345/633 |
| 2005/0128286 A1* | 6/2005 | Richards | G06F 3/04815 348/36 |
| 2008/0030429 A1* | 2/2008 | Hailpern | A63F 13/10 345/8 |
| 2008/0186330 A1* | 8/2008 | Pendleton | A63F 13/10 345/619 |
| 2009/0187389 A1 | 7/2009 | Dobbins et al. | |
| 2010/0253676 A1* | 10/2010 | Mumbauer | G06T 15/20 345/419 |
| 2011/0175810 A1* | 7/2011 | Markovic | G06F 3/017 345/158 |
| 2012/0200600 A1* | 8/2012 | Demaine | A63F 13/10 345/633 |
| 2013/0225305 A1* | 8/2013 | Yang | A63F 13/00 473/152 |
| 2015/0035862 A1* | 2/2015 | Fischer | G06T 19/006 345/633 |

FOREIGN PATENT DOCUMENTS

| | | |
|---|---|---|
| KR | 10-2012-0044461 A | 5/2012 |
| KR | 10-2013-0061538 A | 6/2013 |

* cited by examiner

| m | n | DIRECTION | BACKGROUND KEY |
|---|---|---|---|
|   |   |   |   |
|   |   |   |   |
|   |   |   |   |
|   |   |   |   |

| SKELETON | CORRESPONDING MARKER |
|---|---|
| 605 | 601 |
| 607 | 605,611 |
| 608 | 607,612 |
| 609 | 601,610 |
| 610 | 602 |
| 611 | 603 |
| 612 | 603 |
| 613 | 612,614 |
| 614 | 604 |

APPARATUS AND METHOD FOR PROVIDING CONTENT EXPERIENCE SERVICE

CROSS REFERENCE TO RELATED APPLICATION

This application claims the benefit of Korean Patent Application No. 10-2013-0110421, filed Sep. 13, 2013, which is hereby incorporated by reference in its entirety into this application.

BACKGROUND OF THE INVENTION

1. Technical Field

The present invention relates generally to a method and apparatus for providing content experience service and, more particularly, to a method and apparatus that are capable of simulating instant interactions between a virtual space and a user by tracking the motion of a user in a real space and then projecting the tracked motion onto the virtual space, and providing images corresponding to the simulated results as the multi-image output of first person immersion images for the user and third person inspection view images for the spectators, thereby providing the user and spectators with content experience service having a high sense of immersion.

2. Description of the Related Art

Computer graphics have begun to be used for the entertainment fields, such as gaming or broadcasting thanks to the rapid development of computer hardware in the 1980s. Images chiefly based on two-dimensional (2D) images and represented in black and white have begun to be extended to three-dimensional (3D) graphics and color representations thanks to the rapid progress of image generation-dedicated hardware called a graphic-dedicated card. In particular, in the 3D graphics field, the improvement of picture quality was outstanding, and Sega released the first 3D fighting action game called "Virtual Fighter" in 1993. In fact, in view of the current graphics level, the first 3D fighting action game was characterized as having a very low level plane; however it also incorporated the free settings of viewpoints and realistic hitting sensation which made a user feel as if the user really participated in the game. Thus the aforementioned game gained tremendous popularity despite an expensive usage fee, although it provides scenes in a simple 2-D plane and allows only for fixed viewpoints. Due to the development of high-performance hardware, game series were developed that incorporated digital actors that increasingly resembled true human shapes. In particular, as a 3D graphics-dedicated hardware acceleration function supported in the expensive workstation level became inexpensive sufficient to be used even in personal computers, 3D virtual space-based content which might otherwise have only been enjoyed through expensive hardware came into wide use.

At this time, interfaces based on a 3D virtual space were chiefly based on joysticks. A joystick consisting of a combination of a direction stick and several buttons irrespective of the type of game was an easy to enter commands, but did not provide a sense of immersion because the joystick had almost no relation to a virtual space. In a racing game-based virtual space, an interface that took the form of a driving control environment for a vehicle, such as an acceleration pedal, a brake pedal and a steering wheel, was used; but this interface was limited to a specific virtual space.

In the late 1990s, virtual space-based content that had been simply experienced using an eye and a hand evolved into an interface that used the human body. A game combined with an interface that was configured such that a user pressed sensors on the floor while dancing to music attracted an immense, immediate popularity. Wii, released by Nintendo, provides a remote controller-type control interface called a Wii remote controller. Nintendo Wii has become popular with many people by controlling a virtual environment through the actual motion of a user, rather than simply manipulating a joystick. In order to compete with the popularity of the Nintendo Wii, attributable to the Wii remote controller, Microsoft released "Kinect." Kinect can be used in XBox, which is Microsoft's home game machine. Unlike existing interfaces, Kinect enables a user to play a game based on his or her gestures without requiring any hardware, such as a joystick or a remote controller.

For example, as in Korean Patent Application Publication No. 10-2012-0044461 entitled "Simulated Training Apparatus and Method using Mixed Reality", virtual space-based content have evolved into an interface that generates a real image by capturing an object that enters a user's sight, generates a virtual image corresponding to the real image, converges the real image and the virtual image, and then perform virtual training based on the converged image, that is, an interface that is actually used in the specific training of a user.

Furthermore, various types of head mounted display (HMD) products have begun to be introduced into the market thanks to display technology that implements a slim profile and a small size and also supports high-resolution images. The development of such hardware provides a user with a good tool capable of implementing a virtual space and having a high sense of immersion. Furthermore, there is a need for a method of implementing content-based experience service capable of providing a user with a high sense of immersion.

SUMMARY OF THE INVENTION

Accordingly, the present invention has been made keeping in mind the above problems occurring in the conventional art, and an object of the present invention is to provide a method and apparatus that are capable of simulating instant interactions between a virtual space and a user by tracking the motion of a user in a real space and then projecting the tracked motion onto the virtual space, and providing images corresponding to the simulated results as the multi-image output of first person immersion images for the user and third person inspection view images for the spectators, thereby providing the user and spectators with content experience service having a high sense of immersion.

In accordance with an aspect of the present invention, there is provided a method of providing content experience service, including collecting camera motion information, corresponding to results obtained by tracking positions and directions of an immersive display camera device and an inspection view camera device placed in a studio space, and user motion information corresponding to a position and direction of a user; photographing a space including the user, and separating a real image corresponding to photographed results into a foreground and a background using a background key table; correcting the camera motion information and the user motion information; generating virtual space control information and virtual space information based on the corrected camera motion information and user motion information; and generating a virtual multi-image based on the virtual space control information and the virtual space information, and providing the content experience service based on the generated virtual multi-image.

Providing the content experience service may include generating a first person viewpoint immersion image provided to the immersive display camera device worn by the user; and generating a spectator viewpoint image output to an inspection view image device corresponding to spectators other than the user.

Collecting the camera motion information and the user motion information may include collecting the camera motion information and the user motion information using a marker-based tracking system within the studio space.

Separating the real image into the foreground and the background may include capturing the real image of the user in order to provide spectators with an immersion environment of the user; setting characteristics of the real image to be separated as a background in order to separate the real image into a foreground corresponding to an area of interest to be used in images of the content experience service and the background not corresponding to the area of interest; and, if the inspection view camera device moves while capturing images, comparing a position and direction of the inspection view camera device with a position and direction stored in a background key table and then determining a final background key value.

Generating the virtual space control information and the virtual space information may include generating the virtual space control information that forms a virtual space based on the camera motion information and the user motion information; controlling attributes of a camera that functions as a camera in the virtual space; controlling a motion of an avatar corresponding to a three-dimensional (3D) model that substitutes for a shape of the user within the virtual space; and recognizing a specific gesture based on the user motion information, and controlling objects that form the virtual space based on results of the recognition.

In accordance with another aspect of the present invention, there is provided an apparatus for providing content experience service, including a camera device tracking unit configured to collect camera motion information corresponding to results obtained by tracking positions and directions of an immersive display camera device and an inspection view camera device placed in a studio space; a user behavior tracking unit configured to collect user motion information corresponding to a position and direction of a user; a real image acquisition unit configured to photograph a space including the user, and to separate a real image corresponding to photographed results into a foreground and a background using a background key table; a motion information processing unit configured to correct the camera motion information and the user motion information; a virtual space control unit configured to generate virtual space control information and virtual space information based on the corrected camera motion information and user motion information; and a virtual multi-image generation unit configured to generate a virtual multi-image based on the virtual space control information and the virtual space information, and to provide the content experience service based on the generated virtual multi-image.

The camera device tracking unit may include a camera device motion tracking unit configured to track the positions and directions of the immersive display camera device and the inspection view camera device using a marker-based tracking system within the studio space; a camera device motion information transmission unit configured to transfer the camera motion information, corresponding to the results obtained by tracking the camera device motion tracking unit, to an image server over a network; and a camera device motion information management unit configured to manage the camera motion information according to each identifier of a camera.

The user behavior tracking unit may include a user motion collection unit configured to collect the user motion information; a user motion transmission unit configured to transfer the user motion information to an image server over a network; and a user motion management unit configured to manage the user motion information based on the role of each of the markers attached on the user.

The real image acquisition unit may include a real image photographing unit configured to capture the real image using an image device; an image background setting unit configured to set characteristics of the real image in order to separate the real image into the foreground and the background; and a foreground image management unit configured to, if the inspection view camera device moves while capturing images, compare a position and direction of the inspection view camera device with a position and direction stored in a background key table and then determine a final background key value.

The virtual space control unit may include a virtual space control data generation unit configured to generate the virtual space control information that forms a virtual space based on the camera motion information and the user motion information; a camera attribute control unit configured to control attributes of a camera that functions as a camera in the virtual space; an avatar motion control unit configured to control a motion of an avatar corresponding to a 3D model that substitutes for a shape of the user within the virtual space; a user gesture recognition unit configured to recognize a specific gesture based on the user motion information; and a virtual space interaction control unit configured to control objects that form the virtual space based on results recognized by the user gesture recognition unit.

The virtual multi-image generation unit may include a spectator view generation unit configured to, if the user is designated as an area of interest in the real image, control a depth position of the real image based on settings when an image of the user overlaps an image of a virtual space.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
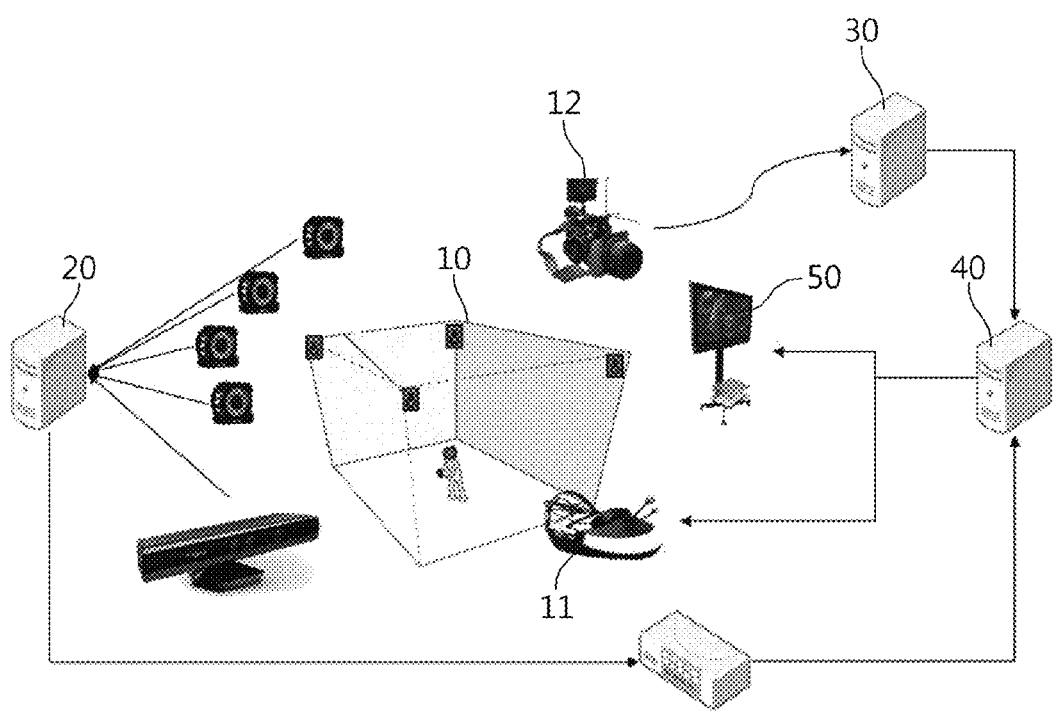
FIG. 1 is a diagram illustrating an environment to which an apparatus for providing content experience service according to an embodiment of the present invention is applied.

The present invention is described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

A method and apparatus for providing content experience service according to embodiments of the present invention are described in detail with reference to the accompanying drawings.

FIG. 1 is a diagram illustrating an environment to which the apparatus for providing content experience service according to an embodiment of the present invention is applied.

First, a user who will experience content experience service wears an immersive display camera device 11, and enters a studio space 10.

Referring to FIG. 1, two camera devices are installed in the studio space 10. In this case, the two camera devices include the immersive display camera device 11 configured to provide the user with a first person viewpoint scene, and an inspection view camera device 12 configured to generate an image of a spectator viewpoint.

In the studio space 10, the user has the immersive display camera device 11 to which a motion tracking marker has been attached attached on his or her head, and views virtual space scenes.

A motion tracking device 20 tracks the position and direction of a user viewpoint and the position and direction of a spectator viewpoint based on the markers attached on the immersive display camera device 11 and the inspection view camera device 12. Furthermore, the motion tracking device 20 collects information about a motion of the user using markers attached to the body of the user, collects motion information using non-marker-based motion sensors, and sends the collected motion information to an image server 40.

The attributes of the cameras that form the virtual space are set or an image is generated based on the motion information transmitted to the image server 40. In other words, when a user wears the immersive display camera device 11 and moves, motion information from the immersive display camera device 11 is projected onto the virtual space in real time so that the user may feel an immersion image as if the user moves in a real space. In this case, the immersive display camera device 11 may be combined with a wireless image transmission device and a portable power supply device so that a user may freely move within the studio space 10.

As in the immersive display camera device 11, a motion tracking marker for motion tracking is attached on the inspection view camera device 12. The inspection view camera device 12 photographs a user in the studio space 10, and sends a photographed image, that is, a real image, to a real image acquisition server 30.

The real image acquisition server 30 separates the received real image into the user and a background, and transfers the separated results to the image server 40.

The image server 40 generates a third person inspection view image by combining information corresponding to the real image received from the real image acquisition server 30, that is, real image information, with the motion information of the inspection view camera device 12 calculated by the motion tracking device 20, and transfers the third person inspection view image to an inspection view image device 50. Accordingly, even common spectators who do not participate in content experience service may be provided with an image so that they may experience the virtual content experienced by a user who experiences the content experience service.

An apparatus for providing content experience service (hereinafter referred to as the "content experience service providing apparatus") that are capable of simulating instant interactions between a virtual space and a user by tracking the motion of a user in a real space and then projecting the tracked motion onto the virtual space, and providing images corresponding to the simulated results as the multi-image output of first person immersion images for the user and third person inspection view images for the spectators, thereby providing the user and spectators with content experience service having a high sense of immersion, is described in detail below with reference to FIG. 2.

Figure 2:
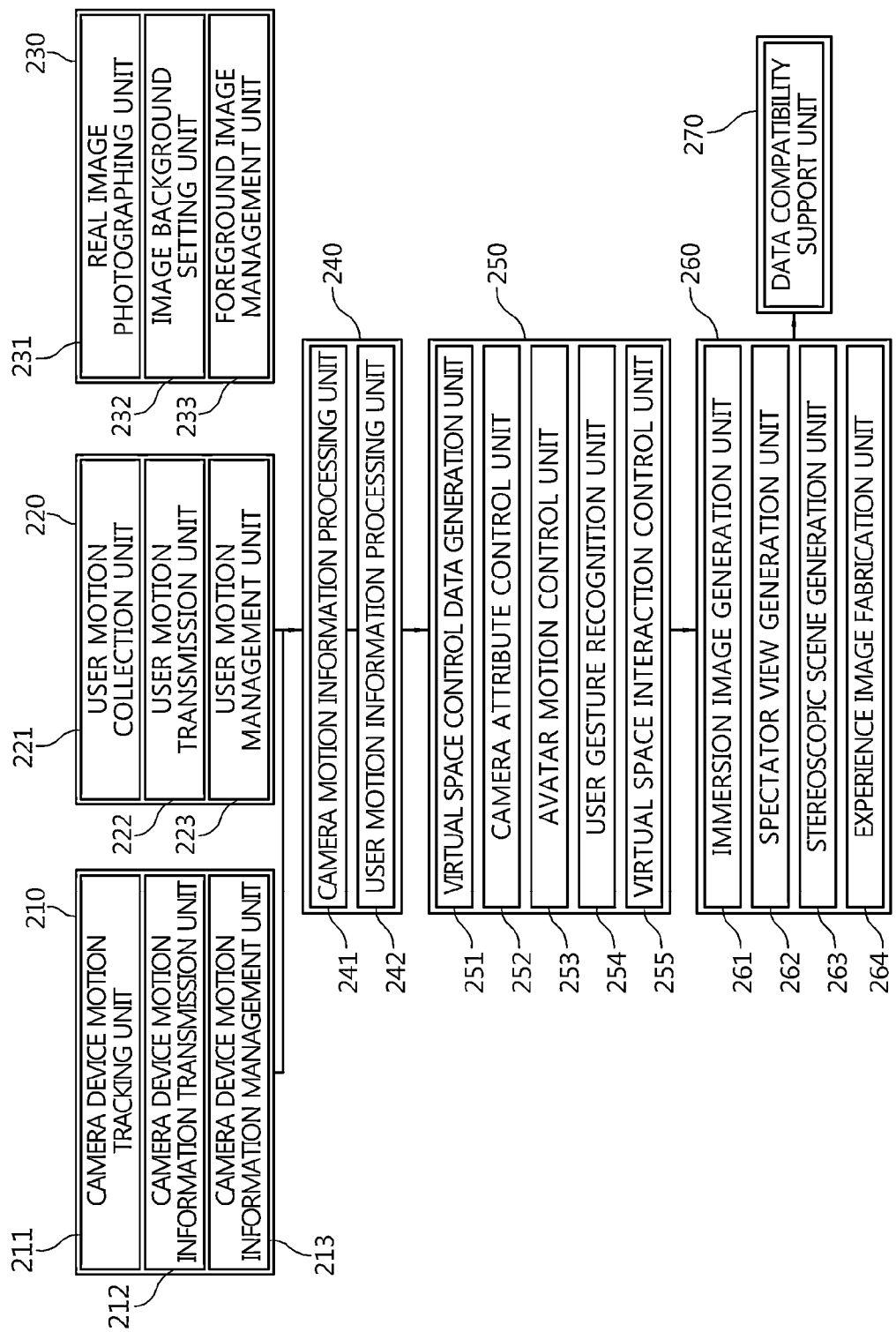
FIG. 2 is a diagram schematically illustrating the configuration of the apparatus for providing content experience service according to an embodiment of the present invention.

FIG. 2 is a diagram schematically illustrating the configuration of the content experience service providing apparatus according to an embodiment of the present invention.

Referring to FIG. 2, the content experience service providing apparatus 200 includes a camera device tracking unit 210, a user behavior tracking unit 220, a real image acquisition unit 230, a motion information processing unit 240, a virtual space control unit 250, a virtual multi-image generation unit 260, and a data compatibility support unit 270.

The camera device tracking unit 210 tracks the motions of cameras on which markers have been attached, that is, the immersive display camera device 11 and the inspection view camera device 12, in the studio space 10.

For this purpose, the camera device tracking unit 210 includes a camera device motion tracking unit 211, a camera device motion information transmission unit 212, and a camera device motion information management unit 213.

The camera device motion tracking unit 211 automatically tracks the positions and directions of the immersive display camera device 11 and the inspection view camera device 12 using a marker-based tracking system within the studio space 10. In this case, the tracking results of positions and directions of the immersive display camera device 11 and the inspection view camera device 12 correspond to camera motion information.

The camera device motion information transmission unit 212 transfers camera motion information, corresponding to results tracked by the camera device motion tracking unit 211, to the camera device motion information management unit 213 managed by the image server 40 over a network.

The camera device motion information management unit 213 assigns an identifier unique to each camera, and manages camera motion information corresponding to each motion identifier.

The user behavior tracking unit 220 tracks information about a motion of the user (hereinafter also referred to as "user motion information"). The user behavior tracking unit 220 may track the motion of the user using a minimum number of markers attached on the user behavior tracking unit 220 because it is difficult to attach a large number of markers on the user due to the nature of service, or may track user motion information using a motion tracking system without using a marker, such as the Kinect.

In this case, whether to use a method using a marker tracking system and a method using a non-marker tracking system is determined by the environmental factors (e.g., color, brightness, and a size) of the studio space 10 or the type of service configuration.

The user behavior tracking unit 220 includes a user motion collection unit 221, a user motion transmission unit 222, and a user motion management unit 223.

The user motion collection unit 221 collects user motion information corresponding to the position and direction of the user.

The user motion transmission unit 222 transfers the user motion information, corresponding to results collected by the user motion collection unit 221, to the user motion management unit 223 managed by the image server 40 over a network.

Figure 3:
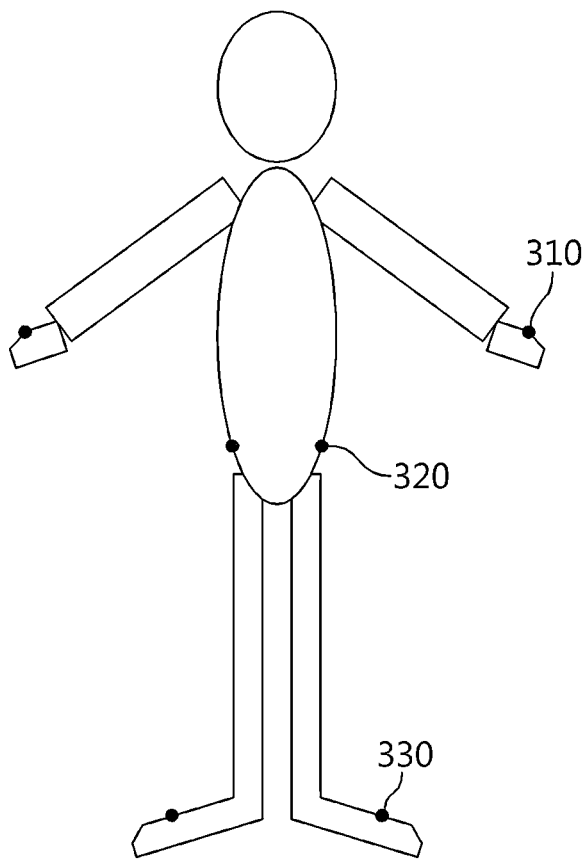
FIG. 3 is a diagram illustrating the disposition of markers attached to the body of a user according to an embodiment of the present invention.

The user motion management unit 223 manages user motion information in accordance with the role of each marker attached on the user. Referring to FIG. 3, the user behavior tracking unit 220 according to an embodiment of the present invention may collect the position and direction of a user using a total of 6 markers that are attached on both hands, both sides of the torso and both feet of the body of the user.

Information about motions of markers attached on both hands of the user, that is, both-hand markers 310, may be used as information for defining an interaction using a hand gesture of the user in the virtual space.

Information about the motions of markers attached on both sides of the torso of the user, that is, both-side markers 320, may be used as information that controls information about the direction of the user.

Information about the motions of markers attached on both feet of the user, that is, both-feet markers 330, may be used as information that controls information about the position of the user.

The real image acquisition unit 230 photographs a space that includes a user who participates in content experience service and separates a real image, corresponding to the photographed results, into: a background, corresponding to an area of interest, to be used in an image of the content experience service; and a background not corresponding to the area of interest.

For this purpose, the real image acquisition unit 230 includes a real image photographing unit 231, an Image background setting unit 232, and a foreground image management unit 233.

The real image photographing unit 231 captures a real image of a user who participates in content experience service in order to provide the immersion environment of the user to spectators.

More specifically, the real image photographing unit 231 may take the form of various types of image devices, such as a universal serial bus (USB) camcorder and a high-quality camera for broadcasting, and may have a high-resolution image of 1080 p or 2 K. An image captured by the real image photographing unit 231 may be separated based on each photographing frame and managed as image information and a camera synchronization signal.

The Image background setting unit 232 sets the characteristics of a real image that has been captured by the real image photographing unit 231 and that will be separated as a background in order to separate the real image into: the background, corresponding to an area of interest, to be used in an image of content experience service and the background not corresponding to the area of interest.

In order to lower a level of difficulty in performing a task for configuring the characteristics of a real image to be separated as a background so as to separate the real image into a foreground and the background, the studio space 10 constructs a chroma key studio painted with a single color, sets a key area according to studio environments (e.g., the position of lightings, the position of cameras and the direction of the cameras), and sets a part, corresponding to a key area in the real image, as the background. Such a method is chiefly used in existing virtual studios. In most cases, however, the position of an image capturing camera is fixed, or the direction of the image capturing camera is fixed in a specific direction. If the position and direction of the image capturing camera are changed, they are not identical to previously set key areas due to the direction of lightings and a shadow effect, thereby deteriorating the quality of background separation.

The content experience service providing apparatus 200 according to an embodiment of the present invention uses a foreground/background separation method based on a chroma key in order to generate an inspection view including a user, but the present invention is not limited thereto.

In general, since a camera is not fixed in the chroma key-based background separation method and thus a background is not changed, a key table from which a background may be separated based on the position and direction of a camera is constructed without using a single unique key value, the position and direction of the camera is analyzed when content experience service is provided, the key value of a table most similar to the analyzed position and direction of the camera is read, and the read key value is used as a key value.

Figure 4:
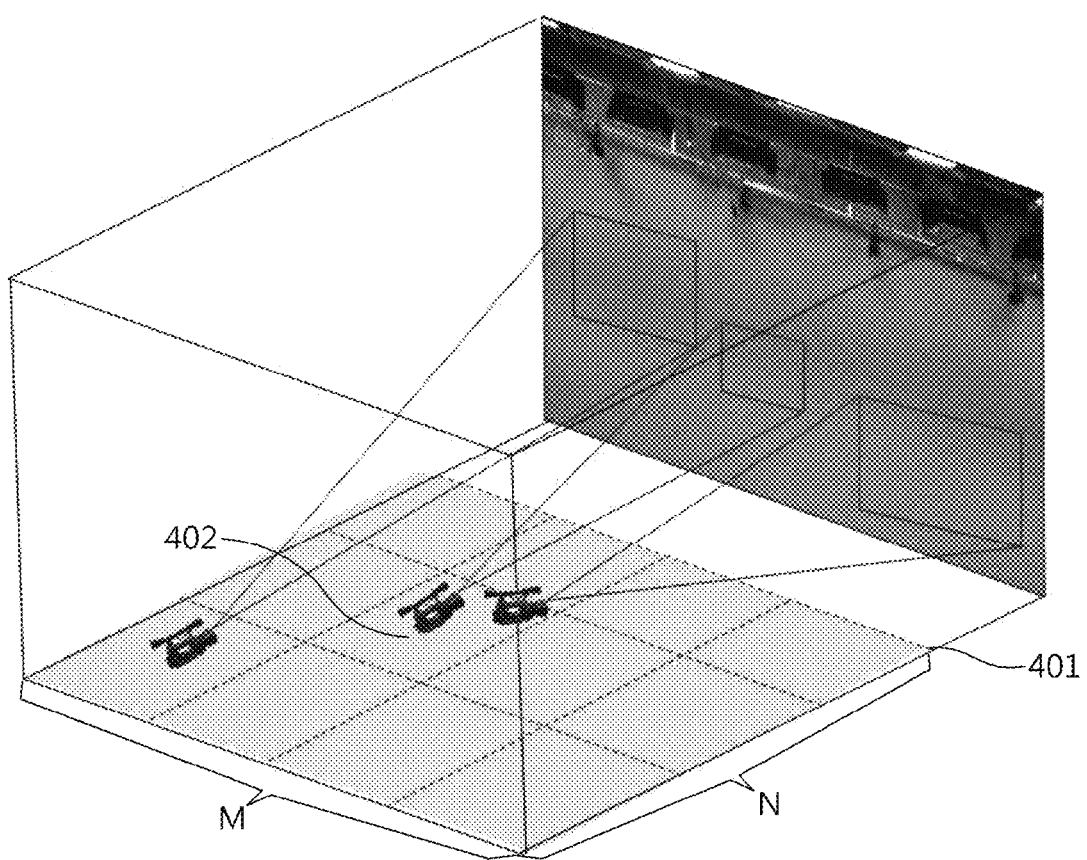
FIG. 4 is a diagram illustrating a key base area for the separation of the foreground and the background based on a background key table according to an embodiment of the present invention.

Referring to FIG. 4, the content experience service providing apparatus 200 defines an area in which the inspection view camera device 12 moves at the bottom of the studio space 10 as a key base area 401. The key base area 401 includes length (M)×breadth (N) spaces.

The inspection view camera device 12 first photographs the background space of the studio space 10 while moving within the key base area 401, and calculates the key value of a corresponding background. The inspection view camera device 12 partitions the key base area 401 into partition areas 402 each having a designated size, places the inspection view camera device 12 in each of the partition areas, faces the inspection view camera device 12 to the background of the studio space 10 in which a chroma key has been installed, and calculates the key value of the background.

Figures 5, 6:
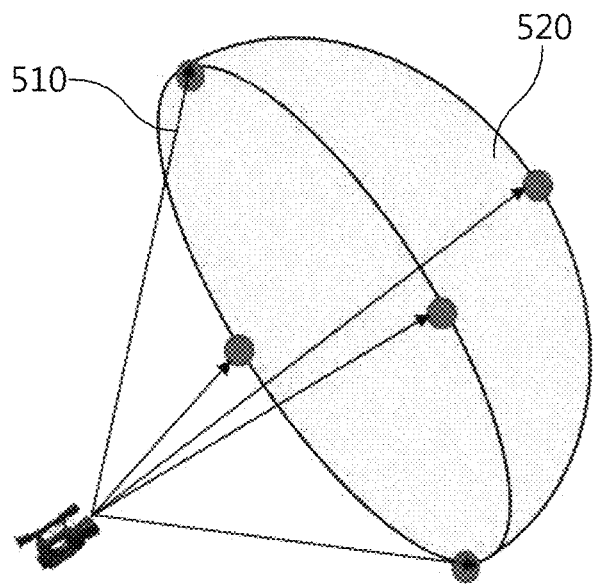
FIG. 5 is a diagram illustrating a camera direction space and directions applied to the background key table according to an embodiment of the present invention.
FIG. 6 is a diagram illustrating the background key table according to an embodiment of the present invention.

Referring to FIG. 5, D or more directions 520 are set in a predetermined camera direction space 510, a background key value is calculated in each of the D or more directions 520, and the calculated key values are added to a table. That is, the background key values according to the D or more directions are stored in each of the partition areas 402.

The motion tracking device 20 according to an embodiment of the present invention previously generates a background key table in a space setting task as illustrated in FIG. 6, calculates position and direction values based on the motion information of the inspection view camera device 12, and extracts the most appropriate background key value by searching the background key table for the calculated position and direction values.

Referring to FIG. 6, the background key table includes a total of 5 columns. In the background key table of FIG. 6, the length partition values of the key base area 401 are stored in "m," and the breadth partition values of the key base area 401 are stored in "n." In FIG. 6, "direction" means the direction of the camera, and may be represented by a Quaternion value.

The direction of the inspection view camera device 12 may be obtained by the motion tracking device 20 that tracks the marker attached to the inspection view camera device 12. Furthermore, the key values of real backgrounds are stored in "background key" of FIG. 6.

If the inspection view camera device 12 moves while capturing an image, the foreground image management unit 233 compares the position $P_{(x,y,z)}$ and direction $Q_{(x,y,z,w)}$ of the inspection view camera device 12, calculated by the motion tracking device 20, with those stored in the background key table, such as that of FIG. 6, and determines the final background key value based on the results of the comparison.

More specifically, the foreground image management unit 233 determines a partition area of the key base area 401 corresponding to the position $P_{(x,y,z)}$ of the inspection view camera device 12 by analyzing the position $P_{(x,y,z)}$, and determines the m and n values of the background key table based on the results of the determination. Thereafter, the foreground image management unit 233 determines the final background key value by searching the background key table for a direction corresponding to the direction of motion information.

If the direction corresponding to the direction of the motion information is not precisely identical to a direction stored in the background key table, the foreground image management unit 233 may determine the most approximation direction to be the next background key, or may search for a column having two direction values most close to the direction corresponding to the direction of the motion information, may perform linear interpolation on a background key corresponding to the two direction values, and may determine the interpolated background key to be the final background key $K_{chroma}$. Thereafter, the final background key may be calculated by the following Equation 1:

$$K_{chroma} = \text{Table}(P_{(x,y,z)}, Q_{(x,y,z,w)}) \quad (1)$$

The motion information processing unit 240 corrects camera motion information, tracked by the camera device tracking unit 210, and user motion information, tracked by the user behavior tracking unit 220, based on the final background key value.

More specifically, the motion information processing unit 240 includes a camera motion information processing unit 241 configured to manage camera motion information tracked by the camera device tracking unit 210 according to each identifier of the camera device, and to provide tasks, such as the removal of noise and the simplification of samples for the camera motion information, and a user motion information processing unit 242 configured to compute the position and direction of a user based on user motion information tracked by the user behavior tracking unit 220.

The virtual space control unit 250 processes the camera motion information and the user motion information processed by the motion information processing unit 240 in a form that may be used in virtual spaces, and generates information for generating virtual scenes based on the processed camera motion information and user motion information, that is, virtual space control information and virtual space information.

For this purpose, the virtual space control unit 250 includes a virtual space control data generation unit 251, a camera attribute control unit 252, an avatar motion control unit 253, a user gesture recognition unit 254, and a virtual space interaction control unit 255.

The virtual space control data generation unit 251 generates virtual space control information for configuring a virtual space based on camera motion information and user motion information.

More specifically, the virtual space control data generation unit 251 converts the camera motion information and the user motion information so that they are used in an image scene.

According to an embodiment of the present invention, a small number of markers need to be used to track the motion of a user so that the markers may be easily attached to and detached from the user. Since a small number of the markers are used, a motion of the user needs to be computed to the highest degree by analyzing information about the markers. In order to control a user avatar in a virtual space, values corresponding to the skeleton structure of the avatar need to be generated. It is difficult to control the bones of the skeleton structure individually using a small number of the markers.

Figure 7A:
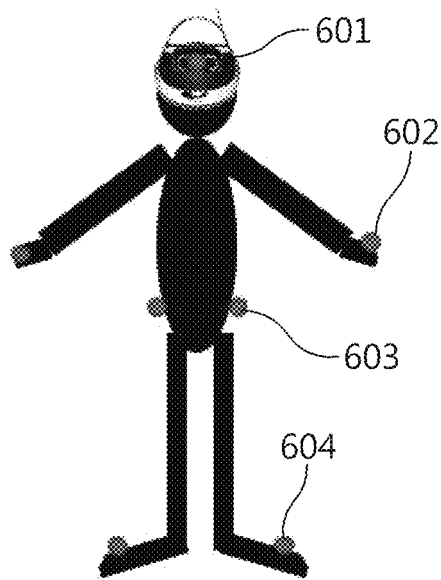
FIGS. 7A to 7C are diagrams showing corresponding markers for calculating information about the skeleton of an avatar based on markers according to an embodiment of the present invention.
Figure 7B:
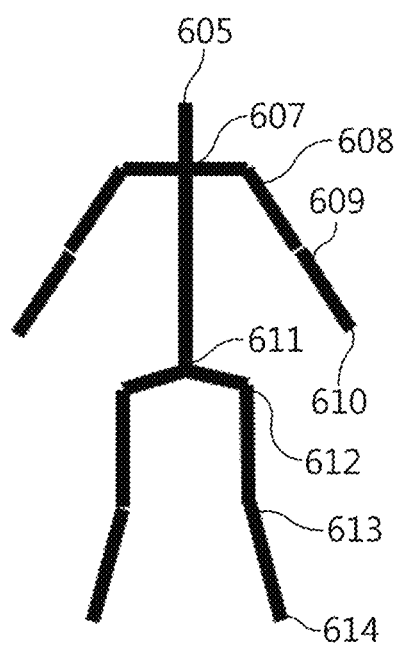
Figures 7C, 8A:
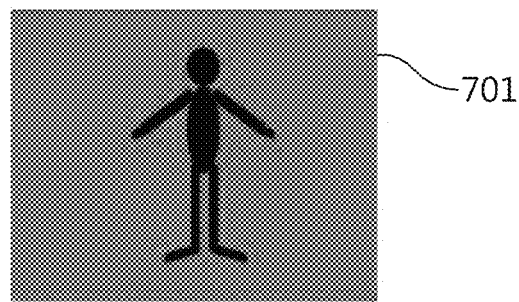
FIGS. 8A to 8D are diagrams showing a real image based on depth estimation based on the analysis of user motions and the synthetic concept of a virtual space according to an embodiment of the present invention.

The virtual space control data generation unit 251 computes motion information for controlling a user avatar based on information about the six markers of FIG. 3 and the marker of the immersive display camera device 11 that is worn by the user. FIGS. 7A to 7C illustrate corresponding markers for computing information about the skeleton of an avatar based on the six markers of FIG. 3 and the marker of the immersive display camera device 11.

The camera attribute control unit 252 controls the attributes of a camera that functions as a camera in a virtual space. In this case, the attributes of the camera includes two types of image mode corresponding to a common image camera and a stereoscopic image camera.

More specifically, the camera attribute control unit 252 may generate a common image in response to a user's selection based on camera motion information received from the motion information processing unit 240, or may generate a stereoscopic image by setting two stereo cameras on both sides based on the camera motion information.

The content experience service providing apparatus according to an embodiment of the present invention generates a stereoscopic image, applies the stereoscopic image to the immersive display camera device 11 in order to increase a sense of immersion felt by a user, and provides an image for spectators as a common image.

The avatar motion control unit 253 controls the motion of a user avatar within a virtual space. The avatar is a 3D model that substitutes for the shape of the user in the virtual space. When the user swings his or her hand or foot in the virtual space, the hand or food is seen in the user's view. Furthermore, the avatar motion control unit 253 functions to insert an avatar model into an inspection view image on behalf of a user and output the inspection view image to a screen.

The user gesture recognition unit 254 analyzes the motion information of the both-hand markers 310 and the both-feet markers 330 in user motion information, and recognizes a specific gesture based on the results of the analysis. The motion of a user is not fixed to any one type, and includes the recognition of a motion gesture based on registration so that the motion is dynamically changed depending on content. A designer defines the type and number of motions provided by content, and registers the motions in advance. That is, a user controls a virtual space by imitating a registered motion gesture.

The virtual space interaction control unit 255 controls objects that form a virtual space based on a gesture recognized by the user gesture recognition unit 254. The virtual space interaction control unit 255 may implement an interaction with a virtual space so that objects forming the virtual space respond to a gesture by controlling the objects based on the gesture.

The virtual space interaction control unit 255 recognizes a gesture based on the basic movement of a hand or foot and configures objects in a virtual space so that the objects move in response to the recognized gesture. Information about a motion of markers attached to a user may be used as information necessary to recognize a gesture, or information required to recognize a gesture may be generated using a motion tracking system, such as the Kinect.

Such a technique is useful to construct a space, such as a space in the sear or a spacewalk, and supports a gesture combination function of constructing an unlimited virtual space without restriction to a real space. A user may be boosted into the air using a tool, such as a wire, using a function of controlling a movement of the user in a space by combining the gestures of a hand and foot, thereby enabling the user to move using the combined gesture. Furthermore, a virtual space using a device on which a sensor is attached, such as skis, a board, or a bike; may be constructed in addition to a user's gesture. In order to increase a sense of immersion, the device may be extended to a system configured to provide the user with a tactile sensation using, for example, air movement and heat.

The virtual multi-image generation unit 260 generates a virtual multi-image based on virtual space control information and virtual space information, and provides content experience service based on the generated virtual multi-image. For this purpose, the virtual multi-image generation unit 260 includes an immersion image generation unit 261, a spectator view generation unit 262, a stereoscopic scene generation unit 263, and an experience image fabrication unit 264.

The immersion image generation unit 261 generates a first person viewpoint immersion image that is provided to the immersive display camera device 11 worn by a user.

The spectator view generation unit 262 generates a spectator viewpoint image that is output to the inspection view image device 50 so that spectators enjoy content simultaneously with a user who directly experiences content experience service. The spectator view generation unit 262 combines a real image and the scenes of a virtual space obtained by the inspection view image device 50, and outputs the combined results to the inspection view image device 50, such as a monitor or beam projector installed outside the studio space 10.

Figure 8B:
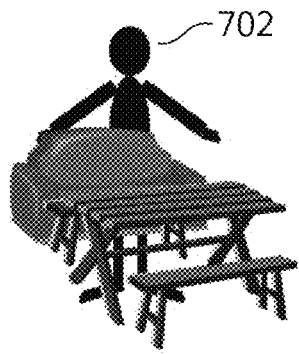
Figure 8C:
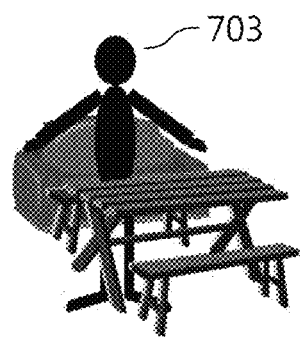
Figure 8D:
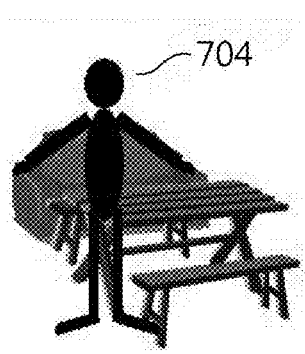

If a user is designated as an area of interest in an obtained real image, the spectator view generation unit 262 controls the depth position of the real image based on setting when an image (see 701 in FIG. 8A) of the user overlaps an image of a virtual space. If the real image is designated as a background, the image of the user is unconditionally placed in the background (see 702 in FIG. 8B). If the real image is designated as a foreground, the position of an image of the user within the virtual space is determined based on data provided by the user behavior tracking unit 220 and the virtual space control unit 250, and the image of the user may be placed in the middle (see 703 in FIG. 8C) or in the foreground (see 704 in FIG. 8D).

The stereoscopic scene generation unit 263 provides the immersion image generation unit 261 and the spectator view generation unit 262 with a stereoscopic image generation function of maximizing a sense of reality. That is, the stereoscopic scene generation unit 263 generates an image corresponding to a left eye and an image corresponding to a right eye based on the position values of the camera set by the camera attribute control unit 252, and outputs the images to the immersive display camera device 11 and the inspection view image device 50.

The experience image fabrication unit 264 generates an image including a user using a real image obtained by the inspection view camera device 12, and stores the generated image as a moving image. Accordingly, after experiencing an immersion virtual space, a user may store a virtual space experienced by the user as separate information.

The data compatibility support unit 270 may support compatibility for various purposes by supporting an information output function based on a standard format so that camera motion information and user motion information may be used in a commercial 3D image creation program, such as Maya or Max; or an obtained real image may be used in an existing commercial image edit program, such as Adobe Premier.

A method of providing content experience service is described in detail below with reference to FIG. 9.

Figure 9:
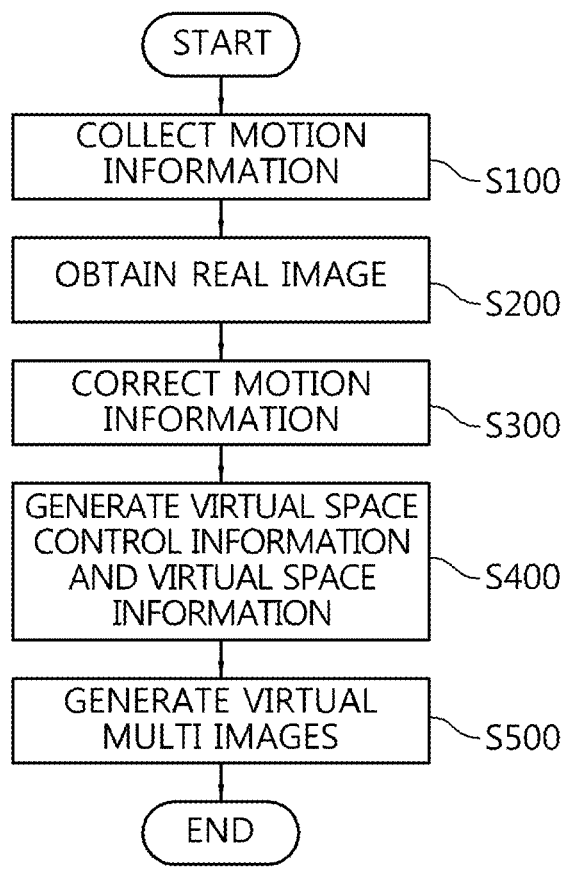
FIG. 9 is a flowchart illustrating a method of providing content experience service according to an embodiment of the present invention.

FIG. 9 is a flowchart illustrating the method of providing content experience service according to an embodiment of the present invention.

Referring to FIG. 9, the content experience service providing apparatus 200 collects camera motion information corresponding to results obtained by tracking the positions and directions of the immersive display camera device 11 and the inspection view camera device 12 and user motion information corresponding to the position and direction of a user who experiences content experience service at step S100.

More specifically, the content experience service providing apparatus 200 tracks the movements of cameras on which markers are attached, that is, movements of the immersive display camera device 11 and the inspection view camera device 12, in the studio space 10.

The content experience service providing apparatus 200 may track the motion of the user using a minimum number of markers attached on the user behavior tracking unit 220 because it is difficult to attach a large number of markers on the user due to the nature of service or may track user motion information using a motion tracking system not using a marker, such as the Kinect. Furthermore, the content experience service providing apparatus 200 manages user motion information in accordance with the role of each of the markers attached on the user. For example, the markers attached on the user may include each of the both-hand markers 310 attached on both hands of the user, the both-side markers 320 attached on both sides of the torso of the user and the both-feet markers 330 attached on both feet of the user, but the present invention is not limited thereto.

The content experience service providing apparatus 200 photographs a space including the user who participates in the content experience service and separates a real image, corresponding to the photographed results, into a foreground corresponding to an area of interest to be used in images of the content experience service and a background not corresponding to the area of interest at step S200.

More specifically, in order to provide spectators with the immersion environment of the user who participates in the content experience service, the content experience service providing apparatus 200 captures a real image of the user. In this case, various types of image devices, such as a USB camcorder and a high-quality camera for broadcasting, may be used.

In order to separate the captured real image into the foreground, corresponding to an area of interest to be used in images of the content experience service, and the background not corresponding to the interested area, the content experience service providing apparatus 200 sets the characteristics of the real image to be separated as the background.

The content experience service providing apparatus 200 according to an embodiment of the present invention uses a foreground/background separation method based on a chroma key in order to generate an inspection view including the user, but the present invention is not limited thereto.

The content experience service providing apparatus 200 defines an area in which the inspection view camera device 12 moves at the bottom of the studio space 10 as the key base area 401. The key base area 401 includes length (M)×breadth (N) spaces.

The inspection view camera device 12 first photographs the background space of the studio space 10 while moving within the key base area 401, and calculates the key value of a corresponding background. The inspection view camera device 12 partitions the key base area 401 into the partition areas 402 each having a designated size, places the inspection view camera device 12 in each of the partition areas, faces the inspection view camera device 12 to the background of the studio space 10 in which a chroma key has been installed, and calculates the key value of the background.

Referring to FIG. 5, the D or more directions 520 are set in the predetermined camera direction space 510, a background key value is calculated in each of the D or more directions 520, and the calculated background key values are added to a table. That is, the background key values according to the D or more directions are stored in each of the partition areas 402.

The motion tracking device 20 according to an embodiment of the present invention previously generates a background key table in a space setting task as illustrated in FIG. 6, calculates position and direction values based on the motion information of the inspection view camera device 12, and extracts the most appropriate background key value by searching the background key table for the calculated position and direction values.

If the inspection view camera device 12 moves while capturing an image, the content experience service providing apparatus 200 compares the position $P_{(x,y,z)}$ and direction $Q_{(x,y,z,w)}$ of the inspection view camera device 12, calculated by the motion tracking device 20, with those stored in the background key table, such as that of FIG. 6, and determines the final background key value based on the results of the comparison.

The content experience service providing apparatus 200 corrects the camera motion information and the user motion information, collected at step S100, based on the final background key value at step S300.

At step S300, the content experience service providing apparatus 200 manages the camera motion information according to each identifier of the camera device, provides tasks, such as the removal of noise and the simplification of samples for the camera motion information, and calculates the position and direction of the user based on the user motion information.

The content experience service providing apparatus 200 processes the camera motion information and user motion information, corrected at step S300, in a form that may be used in virtual space and generates information for generating virtual scenes based on the processed camera motion information and user motion information, that is, virtual space control information and virtual space information at step S400.

The content experience service providing apparatus 200 generates a virtual multi-image based on the virtual space control information and virtual space information generated at step S400 and provides the content experience service based on the generated virtual multi-image at step S500.

The content experience service providing apparatus 200 generates a first person viewpoint immersion image that is provided to the immersive display camera device 11 worn by the user and generates a spectator viewpoint image of the third person viewpoint to be output to the inspection view image device 50 so that spectators may enjoy content simultaneously with the user who directly experiences the content experience service.

Figure 10:
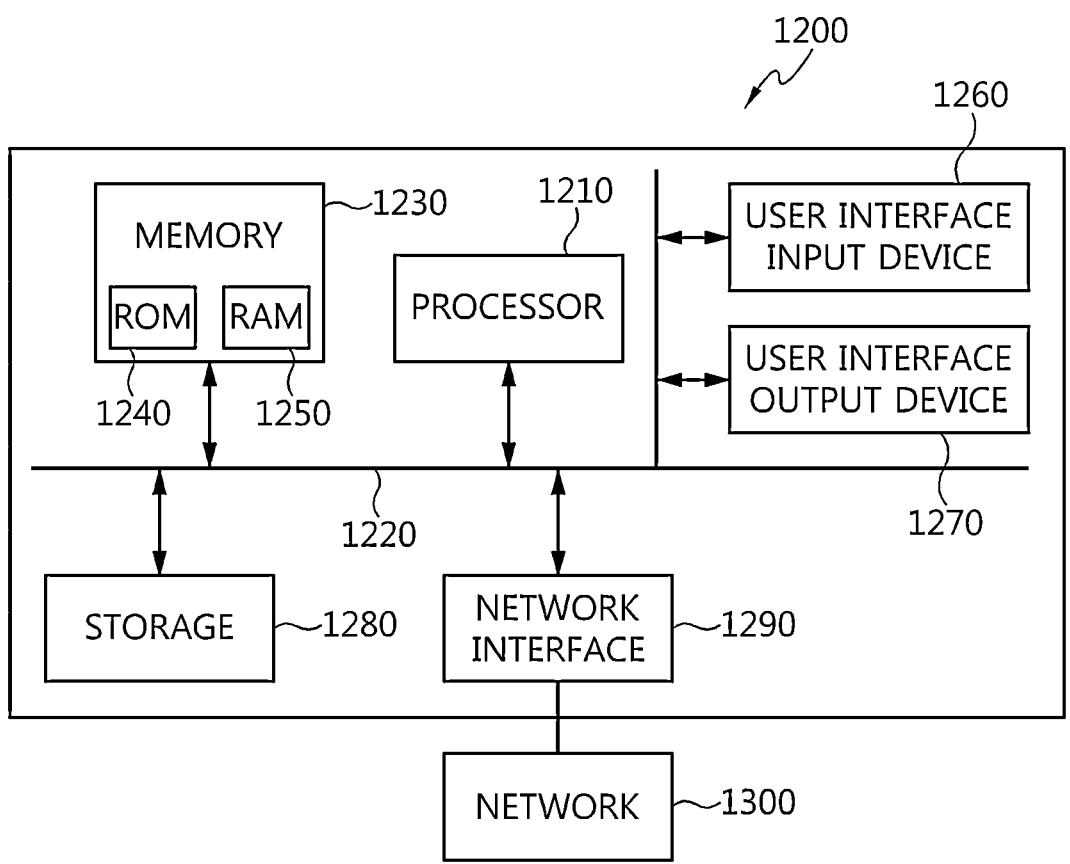
FIG. 10 is an embodiment of the present invention implemented in a computer system.

FIG. 10 is an embodiment of the present invention implemented in a computer system.

Referring to FIG. 10, an embodiment of the present invention may be implemented in a computer system, e.g., as a computer readable medium. As shown in in FIG. 10, a computer system 1200 may include one or more of a processor 1210, a memory 1230, a user interface input device 1260, a user interface output device 1270, and a storage 1280, each of which communicates through a bus 1220. The computer system 1200 may also include a network interface 1290 that is coupled to a network 1300. The processor 1210 may be a central processing unit (CPU) or a semiconductor device that executes processing instructions stored in the memory 1230 and/or the storage 1280. The memory 1230 and the storage 1280 may include various forms of volatile or non-volatile storage media. For example, the memory may include a read-only memory (ROM) 1240 and a random access memory (RAM) 1250.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

As described above, the present invention provides virtual content experience service at the first person viewpoint in which the behavior of a user in a real space can be reproduced in a virtual space without change so that the user can feel the virtual space like the real space and also provides a multi-image function for providing spectators with a virtual space experienced by a user who experiences content experience service through a spectator image of the third person viewpoint as if the spectators view a sports game. Furthermore, the present invention provides a user with virtual images experienced by the user after service has been terminated. The virtual image may be provided as an image at the first person user viewpoint or an image including the user at the third person spectator viewpoint in response to the user's selection. Accordingly, the user can play back the virtual images. According to the present invention, a method and tool for projecting a user and a motion of the user in a real space onto a single virtual space and simulating an interaction with the virtual space are provided, and may be applied to the production of digital image content based on a real-time pre-visualization task that is widely used in the production of various types of real-sense and experience-type game or special effect movies based on motions which increasingly attract interest. Accordingly, an effective system capable of reducing repeated tasks related to the setting of camera compositions in actual positions, the actions of players, 3D special effects etc. and sufficiently incorporating a director's intention or creativity into tasks by previously determining the settings of cameras or player motions upon capturing an image can be constructed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of providing content experience service, comprising:
    collecting camera motion information, corresponding to results obtained by tracking positions and directions of an immersive display camera device and an inspection view camera device placed in a studio space, and user motion information corresponding to a position and direction of a user;
    photographing a space including the user, and separating a real image corresponding to photographed results into a foreground and a background using a background key table;
    correcting the camera motion information and the user motion information;
    generating virtual space control information and virtual space information based on the corrected camera motion information and user motion information; and
    generating a virtual multi-image based on the virtual space control information and the virtual space information, and providing the content experience service based on the generated virtual multi-image.

2. The method of claim 1, wherein providing the content experience service comprises:
    generating a first person viewpoint immersion image provided to the immersive display camera device worn by the user; and
    generating a spectator viewpoint image output to an inspection view image device corresponding to spectators other than the user.

3. The method of claim 1, wherein collecting the camera motion information and the user motion information comprises collecting the camera motion information and the user motion information using a marker-based tracking system within the studio space.

4. The method of claim 1, wherein separating the real image into the foreground and the background comprises:
    capturing the real image of the user in order to provide spectators with an immersion environment of the user;
    setting characteristics of the real image to be separated as a background in order to separate the real image into a foreground corresponding to an area of interest to be used in images of the content experience service and the background not corresponding to the area of interest; and
    if the inspection view camera device moves while capturing images, comparing a position and direction of the inspection view camera device with a position and direction stored in a background key table and then determining a final background key value.

5. The method of claim 1, wherein generating the virtual space control information and the virtual space information comprises:
    generating the virtual space control information that forms a virtual space based on the camera motion information and the user motion information;
    controlling attributes of a camera that functions as a camera in the virtual space;
    controlling a motion of an avatar corresponding to a three-dimensional (3D) model that substitutes for a shape of the user within the virtual space; and
    recognizing a specific gesture based on the user motion information, and controlling objects that form the virtual space based on results of the recognition.

6. An apparatus for providing content experience service, comprising:
    a camera device tracking unit configured to collect camera motion information corresponding to results obtained by tracking positions and directions of an immersive display camera device and an inspection view camera device placed in a studio space;
    a user behavior tracking unit configured to collect user motion information corresponding to a position and direction of a user;
    a real image acquisition unit configured to photograph a space including the user, and to separate a real image corresponding to photographed results into a foreground and a background using a background key table;
    a motion information processing unit configured to correct the camera motion information and the user motion information;
    a virtual space control unit configured to generate virtual space control information and virtual space information based on the corrected camera motion information and user motion information; and
    a virtual multi-image generation unit configured to generate a virtual multi-image based on the virtual space control information and the virtual space information, and to provide the content experience service based on the generated virtual multi-image.

7. The apparatus of claim 6, wherein the camera device tracking unit comprises:
    a camera device motion tracking unit configured to track the positions and directions of the immersive display camera device and the inspection view camera device using a marker-based tracking system within the studio space;
    a camera device motion information transmission unit configured to transfer the camera motion information, corresponding to the results obtained by tracking the camera device motion tracking unit, to an image server over a network; and
    a camera device motion information management unit configured to manage the camera motion information according to each identifier of a camera.

8. The apparatus of claim 6, wherein the user behavior tracking unit comprises:
    a user motion collection unit configured to collect the user motion information;
    a user motion transmission unit configured to transfer the user motion information to an image server over a network; and
    a user motion management unit configured to manage the user motion information based on a role of each of the markers attached on the user.

9. The apparatus of claim 6, wherein the real image acquisition unit comprises:
    a real image photographing unit configured to capture the real image using an image device;
    an image background setting unit configured to set characteristics of the real image in order to separate the real image into the foreground and the background; and
    a foreground image management unit configured to, if the inspection view camera device moves while capturing images, compare a position and direction of the inspection view camera device with a position and direction stored in a background key table and then determine a final background key value.

10. The apparatus of claim 6, wherein the virtual space control unit comprises:
- a virtual space control data generation unit configured to generate the virtual space control information that forms a virtual space based on the camera motion information and the user motion information;
- a camera attribute control unit configured to control attributes of a camera that functions as a camera in the virtual space;
- an avatar motion control unit configured to control a motion of an avatar corresponding to a 3D model that substitutes for a shape of the user within the virtual space;
- a user gesture recognition unit configured to recognize a specific gesture based on the user motion information; and
- a virtual space interaction control unit configured to control objects that form the virtual space based on results recognized by the user gesture recognition unit.

11. The apparatus of claim 6, wherein the virtual multi-image generation unit comprises a spectator view generation unit configured to, if the user is designated as an area of interest in the real image, control a depth position of the real image based on settings when an image of the user overlaps an image of a virtual space.

* * * * *